Nov. 11, 1958  R. YOUNGQUIST ET AL  2,859,808
FUEL TANK WITH EXPELLENT BAG
Filed Jan. 21, 1955  2 Sheets-Sheet 2

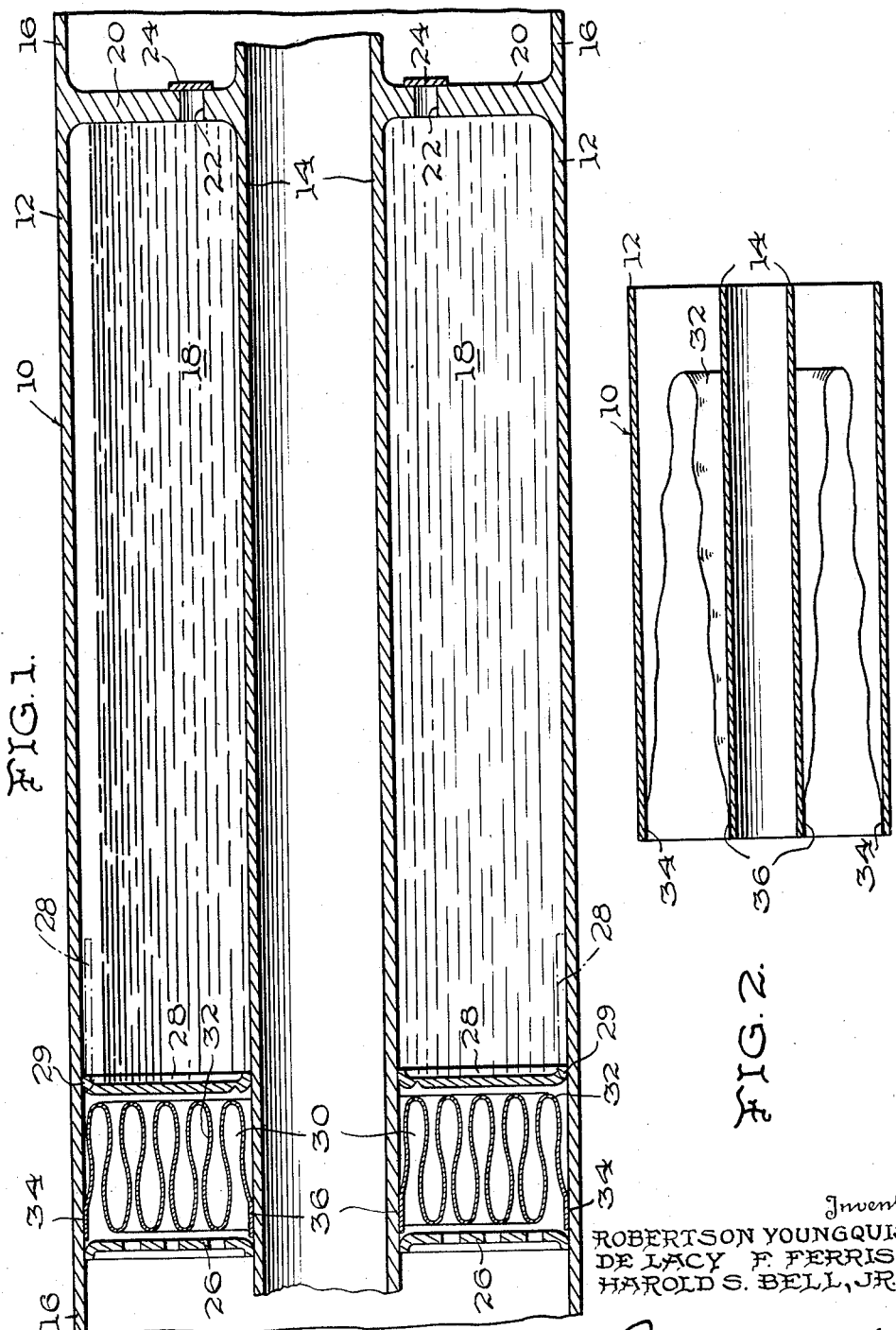

Inventors
ROBERTSON YOUNGQUIST
DE LACY F. FERRIS
HAROLD S. BELL, JR.

By Raymond N. Matson
AGENT

United States Patent Office 2,859,808
Patented Nov. 11, 1958

2,859,808

FUEL TANK WITH EXPELLENT BAG

Robertson Youngquist and De Lacy F. Ferris, Morristown, and Harold S. Bell, Jr., Whippany, N. J., assignors, by mesne assignments, to Thiokol Chemical Corporation, a corporation of Delaware Application January 21, 1955, Serial No. 483,205

6 Claims. (Cl. 158—50.1)

This invention relates generally to fuel tanks and more particularly, to means for ensuring the positive discharge of liquid fuel therefrom.

Various ways of forcing fuel from storage tanks are known in the art and chief among these are the use of fluid pressure or mechanical means such as a piston of one type or another.

When the storage tank is positioned with the pressure gas inlet in the upper portion and the liquid outlet in the lower portion of the tank, the forcing of the fuel therefrom by high pressure gas is readily accomplished. However, when the tank is in an opposite or inverted position, gravity causes the liquid fuel to flow to the pressurizing inlet end of the tank leaving the liquid outlet uncovered. Thus, there is the possibility of having the pressurizing gas bubble up through the liquid fuel and escape at the outlet while leaving the fuel in the tank.

This would be most undesirable in certain applications such as liquid propellant rocket power plants for guided missiles where high pressure gas is introduced at one end of the tank and relied on to expel liquid propellants from the other end.

A further disadvantage in the use of pressurizing gas alone lies in the possibility of a chemical interaction between it and the fuel thus limiting the types of pressure gases which may be used. Obviously the same difficulty is involved when a mechanical fuel expulsion device such as a piston is used in that pressurizing gas would work work its way past the rings of the piston.

A third disadvantage lies in the possibility of cooling and condensing of the pressurizing gas due to contact with the liquid, with the result that larger quantities of pressurizing gas must be supplied.

Accordingly, the chief object of the present invention is to provide an improved means for expelling liquid fuel from storage tanks, which means will be free from the disadvantages characterizing known fuel tank pressurizing means.

Another important object of the invention is to provide an improved fuel tank which is adapted to be discharged by a pressurizing gas and wherein a seal is provided between the gas and the fuel.

A further important object of the present invention is to provide an expellant bag device for use in a fuel tank with pressurizing gas which will positively discharge liquid fuel from a tank regardless of the relative positions of the inlet and outlet of the tank.

Another important object of the present invention is to provide an improved fuel tank including a fuel compartment, an expellant bag compartment, and means for admitting a pressurizing gas into the bag for effecting the ultimate discharge of the fuel from the tank.

A still further important object of the invention is to provide a novel expellant bag for a fuel tank which will automatically act to expel fuel progressively and completely from one end of a tank to the other upon the application of pressurizing gas to the side of the bag opposite from the fuel.

Another object of the present invention is to provide means for hermetically sealing off the expellant bag from contact with the fuel in the tank until such time as pressurization is effected.

Other objects and advantages of the present invention will become apparent during the course of the following description.

In its broadest aspect, the present invention contemplates the use of a flexible bag so mounted in a fuel tank as to seal off the fuel from a pressurizing gas acting on the opposite side of the bag to extend the latter to force the fuel from the tank through a discharge port, the bag being sealed off from the fuel until pressurization is effected.

In the drawings, we have shown one embodiment of the invention. In this showing:

Figure 1 is a central, vertical sectional view of a preferred form of the invention;

Figure 2 is a schematic showing of the expellant bag in fully extended position but not collapsed or stretched;

Figure 3:
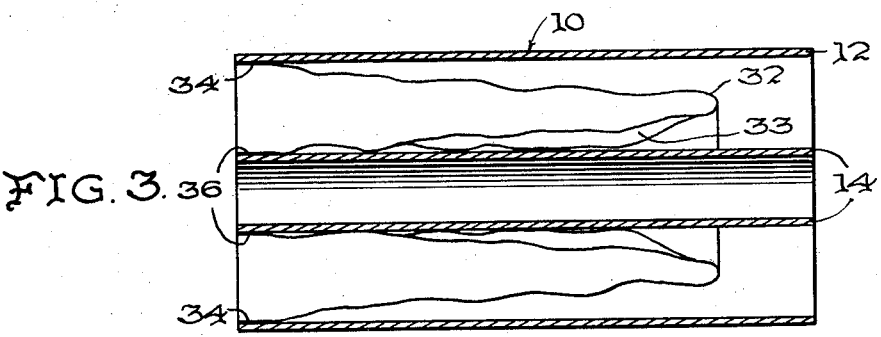
Figure 3 is a schematic showing of the expellant bag collapsing around the inner tank wall of the annular tank but not stretched.

While the expellant bag device comprising the present invention is adapted for use in and with tanks of any type, it is particularly well adapted for use in liquid propellant rocket powerplants for guided missiles. The various features of construction to be described enable the use, for long time storage, of various materials which are suitable for short time contact with the propellant liquid fuels in the tank but which could not remain in such contact for extended periods of time. This is effected by sealing the expellant bag out of contact with the fuel until such time as pressurization of the fuel is effected.

The fuel tank comprising a part of the present invention includes one or more ports at one of its ends and a hermetic seal and burst element spaced from the other end. The liquid propellant or fuel within the tank are prevented from escaping by means of burst discs which seal the port or ports.

A flexible, expellant bag is stored in folded condition within the tank on the other side of the hermetic seal and burst element and the periphery of the mouth of the bag is bonded to the inner and outer walls of the tank. The adjacent end wall of the tank comprises a diffuser plate so that pressurizing gas may be admitted therethrough when it is desired to extend the expellant bag to force the fuel from the tank. The structure described may comprise integral units or it may be formed as an integral part of another structure such as a guided missile casing, etc.

When pressurizing gas is applied to the diffuser plate comprising an end wall of the tank, it is initially sealed from the liquid propellant by the expellant bag and also by the hermetic seal and burst element. The pressure on the expellant bag bursts the seal and the bag thereafter acts under pressure to expel the liquid propellant from the tank progressively from left to right through the port or ports whose burst discs have burst under the pressure to permit escape of the fuel.

Referring to Figure 1 of the drawings, numeral 10 indicates the fuel tank as a whole which is annular in cross section with circumferential outer and inner walls 12 and 14. Although the tank 10 may be formed as a separate unit, it is shown with its outer wall 12 formed integral with the casing 16 of a guided missile, etc.

The fuel storage area 18 of the tank 10 is closed at the right by an annular wall 20 in which a pair of identical fill and outlet ports 22 are formed. Each port is closed after filling of the tank by a burst disc 24 which fails under a predetermined pressure from within the tank to permit the fuel to pass to a fuel injector, etc.

The left end of the tank (as seen in Figure 1) is closed by an annular diffuser plate 26 through which a suitable pressurizing gas is adapted to pass when it is desired to force fuel from the tank 10 through the ports 22. Escape of the fuel to the left is prevented by a thin annular membrane 28 which is spaced from the diffuser plate 26 to form an annular compartment 30 for which it forms a combined hermetic seal and burst disc.

The compartment 30 contains the expellant bag 32 in its stored condition. The material of the bag is of a pliable and stretchable nature and may be, for example, natural or synthetic rubber, polyethylene, or monochlorotrifluoroethylene. The bag may be reinforced with fiberglass or other similar material by taking advantage of the diagonal stretch possible with woven fabrics.

The expellant bag 32 occupies an annular volume and consists of a convoluted radial surface bonded to the outer and inner tank walls 12 and 14 as at 34 and 36 respectively. It will be noted that when a cylindrical fuel tank is used rather than the annular one disclosed by the drawings, the inner folds of the bag are replaced with an unconvoluted radial sheet.

The operation of the present invention is schematically shown by Figures 2–5 inclusive of the drawings. When pressurizing gas is admitted through the diffuser plate 26, the resulting pressure within the bag 32 ruptures the hermetic seal and burst element 28 permitting the expellant bag to unfold for its entire length (Figure 2). At this time, the bag is essentially in its free or unstretched condition. The burst element 28 is initially ruptured about its inner periphery and with its outer periphery acting as a hinge point as at 29, it is forced to the right and outwardly—as the bag pressure further ruptures it—against the wall 12 as indicated in dotted lines in Figure 1.

As shown in Figure 3, the inner portion of the expellant bag next collapses circumferentially around the inner tank wall 14, the folds 33 of excess material acting as passages to insure that all of the propellant liquid will be squeezed out from between the bag 32 and the wall 14. This collapse takes place progressively from the left or pressurizing end of the tank to the propellant liquid outlet end.

Figure 4:
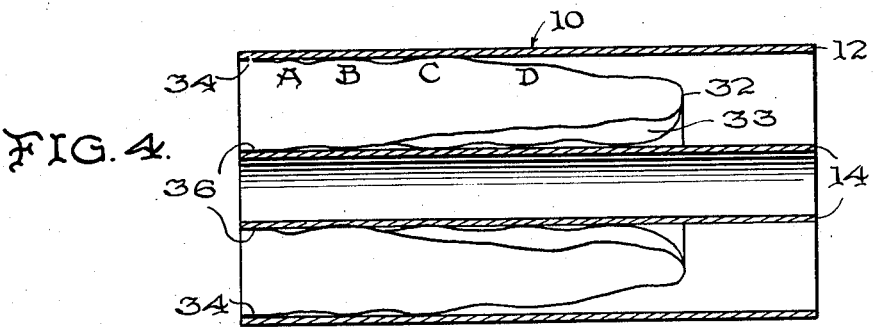
Figure 4 is a schematic showing of the expellant bag stretching to contact the outer tank wall progressively from left to right.

As pressurizing gas continues to enter through the diffuser plate 26, the outer portion of the bag grows circumferentially until limited by the outer wall 12 of the tank. The growth or expansion starts first at the left or pressurizing end of the tank since, for an assumed uniform bag thickness, the highest stresses will exist at the largest diameter or at point A (Figure 4).

Expansion or growth of the bag at A is followed by growth at B, C, D, etc., thus expelling the liquid fuel from the pressurizing end of the tank toward the propellant outlet end somewhat in the manner of a piston moving from left to right. During this period, some axial growth of the bag 32 will tend to occur but large amounts of axial growth will not be made until the circumferential expansion is completed, since the stresses in the axial direction are only half of the circumferential stresses.

Figure 5:
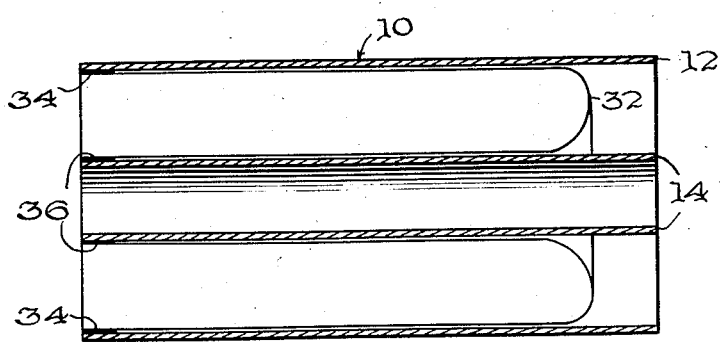
Figure 5 is a schematic showing of the expellant bag stretching axially to the right.

Axial growth of the bag 32 is shown in Figure 5 and it will be noted that entrapment of liquid fuel by the bag has been avoided by its left to right growth. This eliminates the problems—where a piston is used—of surface dents, out-of-roundness, and eccentricity.

The expellant bag 32 thus provides a hermetic seal between the pressurizing gas and the liquid propellants preventing chemical interaction between the two and the bag's piston-like behavior is a function of the original shape of the bag and would not be obtained if it was of the convoluted cylindrical surface or bellows type. Moreover, the sealing off of the bag from the propellant liquids permits a wide selection of bag materials that need not be compatible with the fuel to be expelled on a long term basis thus permitting greater flexibility in bag design.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. An apparatus for discharging a liquid fuel under pressure comprising a tank having a discharge port including a burst disc thereover adjacent one end wall, a diffuser plate for admitting pressurizing gas forming the other end wall of said tank, a burst membrane adjacent said plate but spaced therefrom and defining a fixed-volume fuel compartment with said first mentioned end wall, and an inflatable bag in said tank between said membrane and said end plate and having its mouth bonded to said tank adjacent to said plate, said bag having walls folded forwardly and rearwardly a plurality of times and adapted under the influence of pressurizing gas to inflate and expand past said membrane into said compartment to a point adjacent said first mentioned wall and expel fuel contained in said compartment through said discharge port and burst disc.

2. An apparatus as recited in claim 1 wherein said bag is of stretchable material and the closed end of the bag is of smaller diameter than its mouth whereby the inflating bag progressively contacts the sides of said tank from said diffuser plate to the discharge port end of said tank.

3. An apparatus as recited in claim 1 wherein said bag is folded when in an uninflated condition.

4. An apparatus as recited in claim 1 wherein the space between said membrane and said plate constitutes a minor portion of the tank space and said bag thus occupies a minor portion of said tank when in uninflated condition.

5. An apparatus as recited in claim 1 wherein said tank includes an inner wall which forms with the outer wall a tank space of annular cross-section.

6. An apparatus as recited in claim 5 wherein said bag is of stretchable material and the closed end of the bag is of smaller diameter than its mouth whereby the inflating bag progressively contacts said inner and outer walls from said diffuser plate to the discharge port end of said tank.

References Cited in the file of this patent

UNITED STATES PATENTS

| | | |
|---|---|---|
| 2,074,959 | Guest | Mar. 23, 1937 |
| 2,105,160 | Piquerez | Jan. 11, 1938 |
| 2,542,929 | Kimball | Feb. 20, 1951 |
| 2,628,673 | Ericson | Feb. 17, 1953 |
| 2,671,312 | Roy | Mar. 9, 1954 |